Oct. 11, 1938.  C. KANNEL  2,132,422
VEHICLE VENTILATING MEANS
Filed March 1, 1937  3 Sheets-Sheet 1
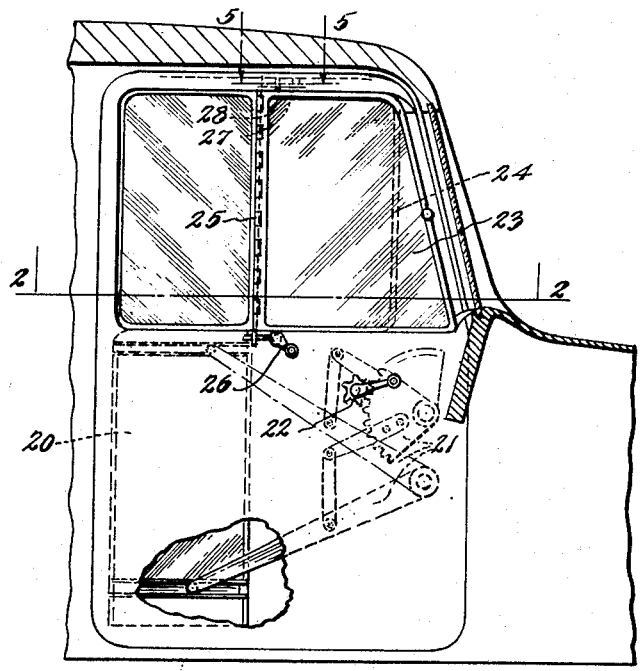
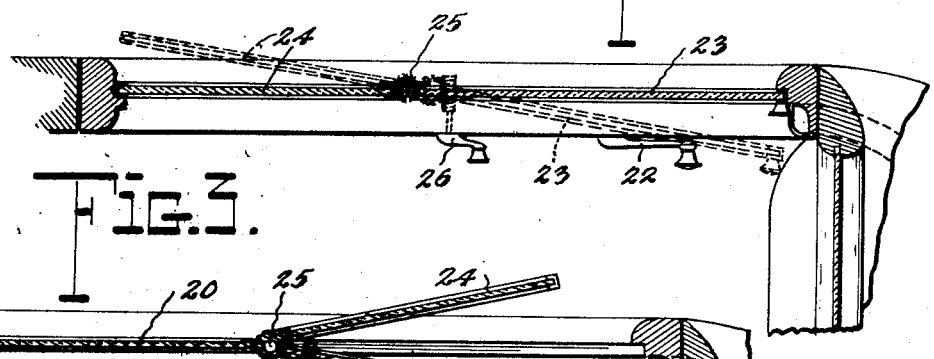
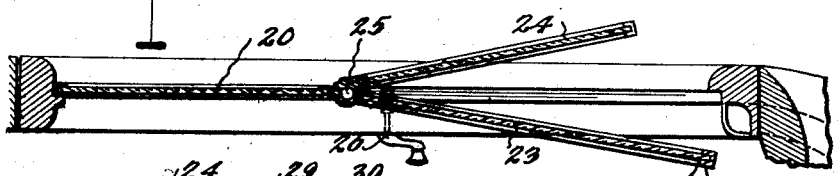
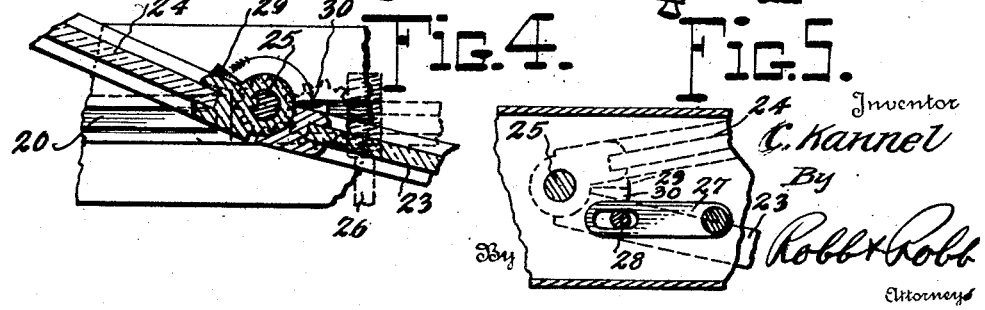
Inventor
C. Kannel
By
Robb & Robb
Attorneys Oct. 11, 1938.                C. KANNEL                2,132,422
                        VEHICLE VENTILATING MEANS
                         Filed March 1, 1937           3 Sheets-Sheet 2
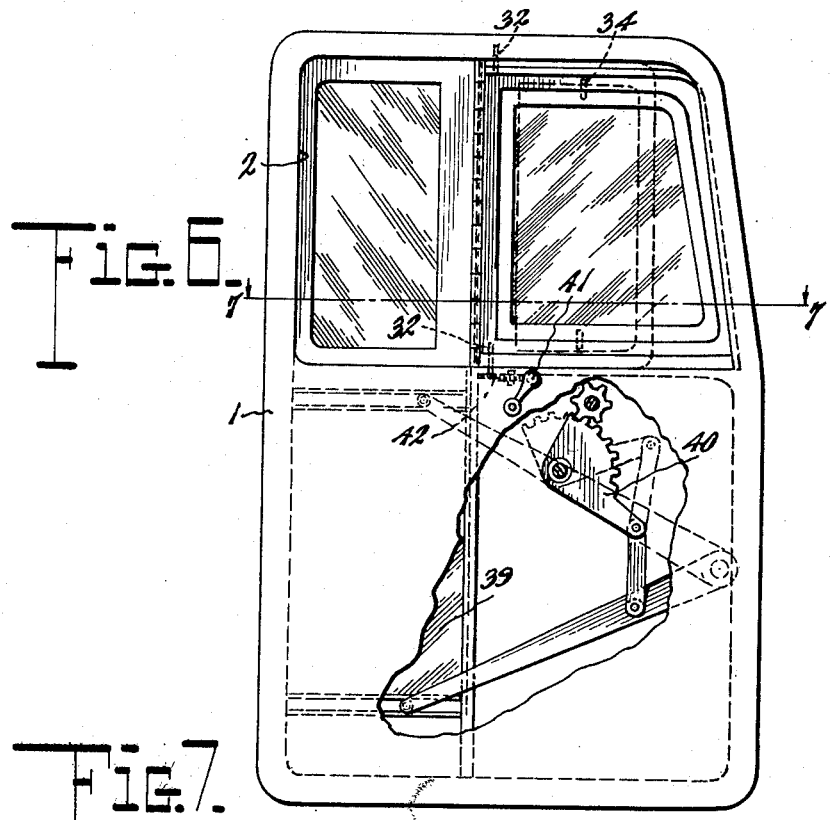
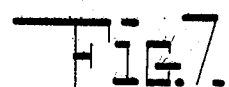
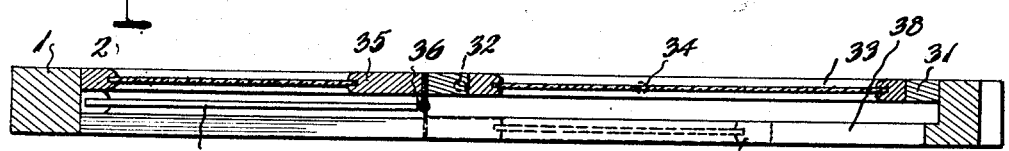
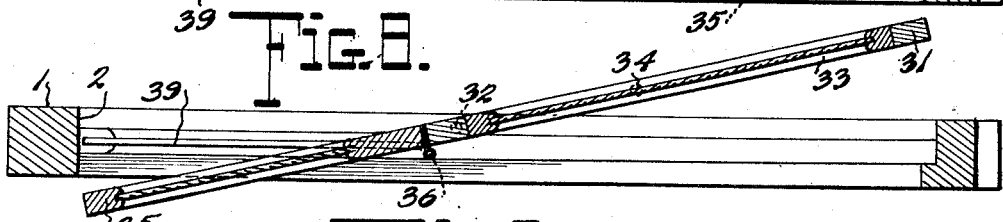
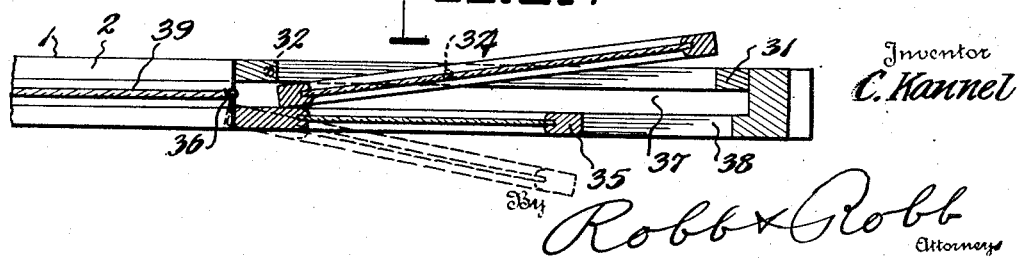
Inventor
C. Kannel
By Robb & Robb
Attorneys Oct. 11, 1938.  C. KANNEL  2,132,422
VEHICLE VENTILATING MEANS
Filed March 1, 1937    3 Sheets-Sheet 3

Inventor
C. Kannel
By Robb & Robb
Attorneys

Patented Oct. 11, 1938

2,132,422

UNITED STATES PATENT OFFICE 2,132,422

VEHICLE VENTILATING MEANS

Charles Kannel, Cleveland, Ohio

Application March 1, 1937, Serial No. 128,505

11 Claims. (Cl. 296—44)

The present invention relates to improvements in ventilating means for automobiles or other vehicles and has for its object the provision of an air deflector or wing constructed and arranged relative to the window opening and closure means therefor as to permit adequate ventilation of the vehicle without admitting rain, snow, dust or the like, or direct draft on the occupants.

A further object in view, having regard to one form of the invention, is the provision of a deflector device of the single wing type in combination with a closure having horizontal sliding movement for providing an air opening of relatively small size at the front of the window opening and near the windshield by means of which a reverse flow of incoming air may be produced with a cross flow along the windshield and at the front of the vehicle.

A further adaptation of my invention embodies a double wing or foldable deflector means which, in association with the half section window closure of present popularity, gives rise to simple control of air flow conditions so as to provide no-draft ventilation or fully adequate ventilation during rain or snow without allowing such rain or snow to enter the vehicle.

Other and further objects and advantages of the invention will be hereinafter set forth and the novel features thereof defined by the appended claims.

In the drawings:

Fig. 1 is a side elevation of a vehicle door embodying one form of my invention, certain of the vehicle parts being shown in section;

Fig. 2 is a horizontal sectional view taken about on the plane 2—2 of Fig. 1, showing the outer deflector member in full lines closing the rear half of the window opening and in dotted lines its no-draft ventilation position and the inner deflector member in closed position with respect to the front portion of the window opening and in dotted line position its no-draft ventilation disposition;

Fig. 3 is a similar view showing the deflector members adjusted to form a pocket therebetween and causing reverse flow of the air toward the vehicle windshield, the vertical adjustable closure member being elevated into its closed position;

Fig. 4 is a fragmentary sectional view of the mounting of the deflector members and the abutment means for cooperative operation of the same;

Fig. 5 is a sectional view on the line 5—5 of Fig. 1 and showing the friction means for holding one of the deflector members in adjusted positions;

Fig. 6 is a side elevation of a vehicle door having a modified form of my invention applied thereto and embodying a double outer window-wing construction and an inner deflector wing shown in full lines closing the rear half of the window opening and in dotted lines adjusted for cooperation with the outer wing, parts being broken away to show more clearly the details of construction;

Fig. 7 is a horizontal sectional view on the line 7—7 of Fig. 6;

Fig. 8 is a similar sectional view showing the adjustment of the deflector members for draft ventilation purposes;

Fig. 9 is a horizontal sectional view showing the closure member of the outer wing element adjusted to an angular position relative to the outer frame of said wing and the inner deflector wing in its normal position against the frame stop in full lines and in a dotted line position to form a V-pocket with the outer wing section when the latter is adjusted at an angle;

Like reference characters designate corresponding parts in the several figures of the drawings.

Figure 10:
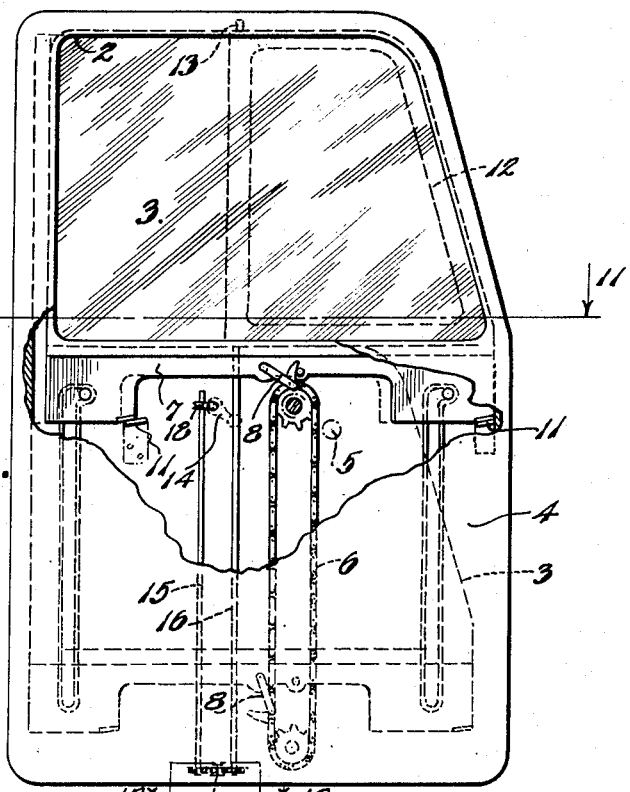
Fig. 10 is a side elevation of a vehicle door showing a further modification of this invention, parts being broken away to more clearly show the details of construction.
Figure 11:
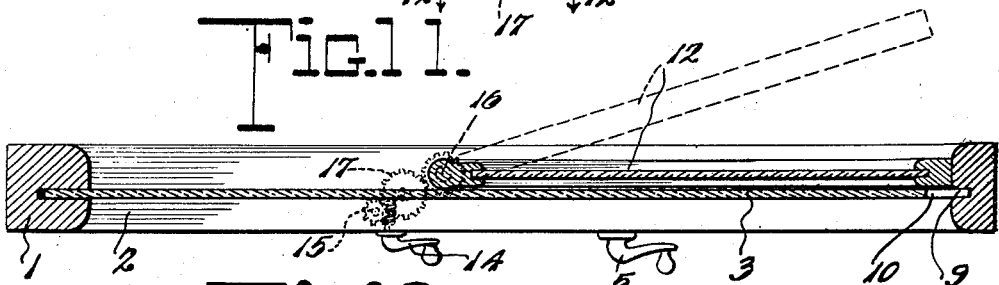
Fig. 11 is a horizontal sectional view on the line 11—11 of Fig. 10.
Figure 12:
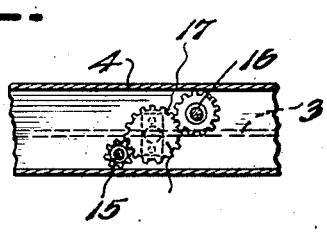
Fig. 12 is a sectional view on the line 12—12 of Fig. 10.

Referring to the drawings and particularly to that form of my invention shown in Figs. 10 to 12, 1 designates the door of an automobile having the usual window opening 2 and its closure 3, of conventional construction and operation. This closure is capable of vertical movement to and from the usual compartment or pocket 4 under the control of the crank-operated mechanism, which includes the crank 5 and sprocket chain 6 to which the window mounting 7 is connected by the link 8, and further horizontal or sliding movement when in elevated position. The arrangement is such that the window 3 is first moved horizontally by the crank operation to disengage the front edge from the frame slot 9 at this point and thereby provide a narrow opening 10 which admits air to the inside of the body and further operation of the crank will effect lowering movement when the support 7 is disengaged from the locking lug 11.

Since this mechanism is conventional, further specific description is unnecessary, it being sufficient to note that I take advantage of this construction to obtain the novel results as regards ventilation by association therewith of my deflector wing 12 which is pivoted at its rear end, as at 13, in the opening 2 about midway thereof so as to freely swing outwardly of the opening by operation of the second crank 14, the vertical shaft 15 and pivot shaft 16 with intermediate gearing 17, 18.

It will be apparent from the foregoing that when the wing 12 is adjusted to an angular position, a trap or pocket is formed between it and the main closure 3. When the latter is opened by the initial operation of its crank 5, the air flows through the opening 10 at the front and along the inside of the windshield (not shown). The direct draft of air on the operator and the access of water, snow or dust particles is thereby prevented, while desired ventilation, controlled by the adjustment of the wing, is accomplished. This arrangement is the simplest one, and least expensive for the purposes and forms an important improvement in present types of vehicle ventilating means.

Passing now to another embodiment shown in Figs. 1 to 5, I have designed my ventilation construction to accord with the use of the half-size window closure capable of vertical movement to and from the door well. This closure 20 occupies the rear portion of the window opening and is raised or lowered by the conventional crank mechanism 21, including the crank 22 which need not be further described herein.

In the forward part of the window opening, my deflector means is mounted, and includes a two part or wing arrangement comprising the inner wing 23 forming a complement to the rear window 20 to occupy the window opening and the outer wing 24 which functions as the primary air deflector. These two wings 23 and 24 are mounted upon a common pivot shaft 25 adapted to be positively rotated by the secondary crank 26, the outer wing 24 alone being positively connected to said shaft 25 for rotation therewith. The wing 23 is frictionally connected with the shaft and a holding device composed of a friction lever 27 mounted in the frame at the top, cooperating with the lug 28 on the wing tends to maintain the inner wing at any adjusted position.

It will be obvious that this arrangement just described forms an air-receiving pocket corresponding to that of the first form, but takes advantage of the swinging movement of the closure section 23 to secure greater ventilation efficiency. Thus when it is raining and a direct opening through the window is not desired, the rear closure 20 is elevated to closed position while the wing 23 is adjusted inwardly a desired amount and the outer wing 24 turned outwardly into the air stream. The air is thus pocketed or reversely flowed against and across the windshield, as before described.

The adjustment of these wings 23 and 24 may be obtained by proper manipulation of the crank 26. Thus when the wing 23 is in full-closed position, the crank 26 is rotated to move the outer wing 24 inwardly until the lugs 29 and 30 are brought together, whereupon continued movement shifts the wing 23 inwardly to the desired extent. The crank is now reversed and the wing 24 moved outwardly to the angular position desired, as shown in Fig. 3.

When it is desired to obtain a "no-draft" ventilation with this arrangement, the rear section 20 may be lowered into the door well and the wing 24 rotated about its pivot until it occupies the position shown in dotted lines in Fig. 2 in substantial alignment with the section 23.

A slightly modified form of the arrangement just described is illustrated in Figs. 6 to 9. In this construction, the double wing form of ventilating means is retained, but in this case the outer wing, which is composed of the outer frame 31 pivoted in the window opening at 32 and the inner window 33 pivoted in the frame 31 at 34, lies flush with the outer surface of the door and constitutes a closure for the forward section of the window opening under normal conditions. The inner deflector wing 35 is hingedly connected to the rear vertical edge of the outer frame 31 so as to swing about the pivot 36. This deflector wing 35 in its normal position, as shown in Fig. 9 particularly, abuts with the stop strip 37 and is of a width dimension substantially less than the width dimension of the outer wing so as to leave an opening 38 through the door when in the closed position above referred to.

This deflector wing 35, however, may be shifted about its hinge pivot 36 to an angular position such as shown in dotted lines in Fig. 9 or may be completely swung around to occupy the closing position for the rear portion of the window opening, as shown in full lines in Fig. 7.

Thus the outer wing member and the inner deflector wing member may be aligned to establish a complete closure for the window opening of the door, but the member 35 and its cooperative outer wing construction may be positioned at various angles, one of which is shown in Fig. 8 and in which the air may be directly deflected into the vehicle. The amount of air which is thus deflected by this arrangement may be regulated, if desired, by independently positioning the inner window portion 33 of the outer wing at angular positions with relation to its carrying frame.

When it is desired to have a cooperative action on the part of the outer and inner wings for the purpose of forming a substantially V-pocket for the front portion of the window opening and to have the rear portion of said opening closed, the wings are adjusted to any of the possible positions, such as disclosed in Fig. 9, and the vertically moving window 39 moved upwardly from the door well so as to close more or less of the rear portion of the window opening. Such disposition of these closure elements is particularly desirable when it is raining and ventilation is desired without admitting the rain to the vehicle.

In any of the V-pocket arrangements of the wing, a reverse flow of the air toward the windshield is produced. The vertical adjustment of the closure member 39 is produced by the usual type of actuating mechanism 40 shown in Fig. 6 and disposed in the well portion of the door, while the adjustment of the outer wing member, speaking with reference to its frame 31, is produced by the crank handle 41 operatively connected by gearing 42 to the pivot member or axis 32 of the frame.

This construction of ventilating means is particularly desirable because of the many conditions which may be taken care of by the various closure elements of which it is composed and it is to be understood in this connection that only certain typical adjustments of these parts are shown in the drawings.

It is to be understood that while the ventilating means have herein been illustrated in conjunction with a door window opening, they may be applied to other openings of vehicles equally as well.

Having thus described my invention, what I claim as new and desire to secure by Letters Patent is:

1. In vehicle ventilating means of the class described, the combination with a window opening, and a closure member for closing a portion of the window opening, of a pair of deflector members disposed in register with the other portion of the window opening, and means for swinging one of said members outwardly of the window opening to a position extending over the portion of the opening controlled by the first mentioned closure member when the latter is in opened position.

2. In vehicle ventilating means of the class described, the combination with a window opening, and a closure member for closing a portion of the window opening, of a pair of deflector members disposed in register with the other portion of the window opening, and means for swinging one of said members outwardly of the window opening to a position extending over the portion of the opening controlled by the first mentioned closure member when the latter is in opened position and the other deflector member into a position inwardly of the window opening.

3. In vehicle ventilating means of the class described, the combination with a window opening, and a closure member for closing a portion of the window opening, of a pair of deflector members disposed in register with the other portion of the window opening, common pivot means for said deflector members, and means for actuating one of said members through said pivot means.

4. In vehicle ventilating means of the class described, the combination with a window opening, and a closure member for closing a portion of the window opening, of a pair of deflector members disposed in register with the other portion of the window opening, common pivot means for said deflector members, and means for actuating one of said members from the other to position them in angular relation to each other.

5. In vehicle ventilating means of the class described, the combination with a window opening, and a closure member for closing a portion of the window opening, of a pair of deflector members disposed in register with the other portion of the window opening, means for pivoting one of said members to swing away from the window opening, and a connection between said pivoted member and the other deflector member for positioning the two members simultaneously into deflecting position.

6. In vehicle ventilating means of the class described, the combination with a window opening, and a closure member for closing a portion of the window opening, of a pair of deflector members disposed in register with the other portion of the window opening, means near one end of one of said members for pivoting it in the window opening, and a hinging connection between the two members for providing swinging movement of both said deflector members.

7. In vehicle ventilating means of the class described, the combination with a window opening, and a closure member for closing a portion of the window opening, of a pair of deflector members disposed in register with the other portion of the window opening, one of said members being of less area than the portion of the window opening in which the deflector members are mounted and the other of said members being co-extensive with said portion, said deflector members being shiftable into angular position relative to each other and to the window opening.

8. Ventilating means as set forth in claim 7, wherein one of said deflector members is composed of a pivoted frame support and a window sash movably carried thereby.

9. In vehicle ventilating means of the class described, the combination with a window opening, and a closure member for closing a portion of the window opening, of a pair of deflector members disposed in register with the other portion of the window opening, one of said members being shiftable outwardly of said opening to deflect air against the other and into the vehicle through that part of the opening controlled by said other member, the outwardly swingable member being composed of a main frame pivoted at one end in the window opening and an inner window member pivoted intermediate its length in said frame.

10. In vehicle ventilating means of the class described, the combination with a window opening, and a closure member for closing a portion of the window opening, of a pair of deflector members disposed in register with the other portion of the window opening, one of said members being shiftable outwardly of said opening to deflect air against the other and into the vehicle through that part of the opening controlled by said other member, one of the deflector members being swingable into the portion of the window opening occupied by the first mentioned closure member.

11. In vehicle ventilating means of the class described, the combination with a window opening, and a closure member for closing a portion of the window opening, of a pair of deflector members disposed in register with the other portion of the window opening, one of said members being shiftable outwardly of said opening to deflect air against the other and into the vehicle through that part of the opening controlled by said other member, one of the deflector members constituting a closure member for one portiton of the window opening and being provided with manual means for shifting the same, and the other deflector member being inwardly swingable and constituting a closure member for the other portion of the window opening independent of the first mentioned closure member.

CHARLES KANNEL.